O. B. THOMPSON.
Fifth-Wheel.
No. 164,611. Patented June 15, 1875.
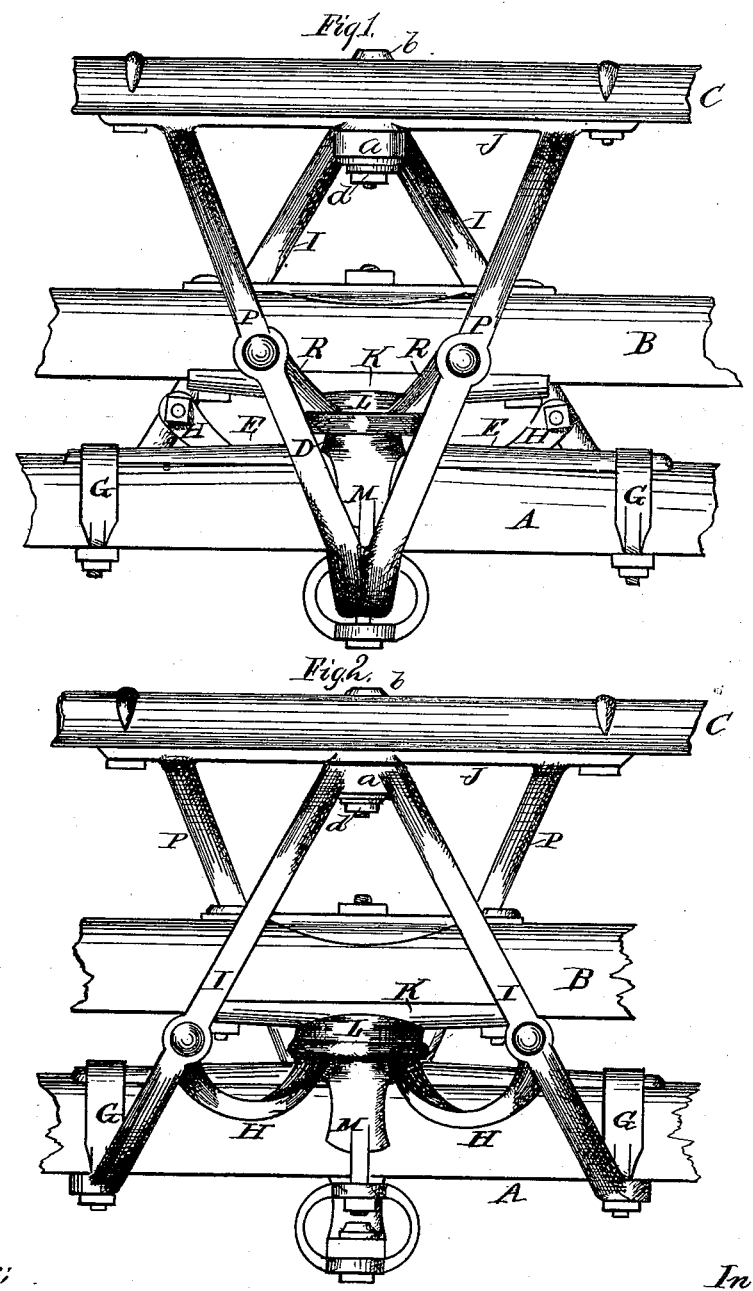

2 Sheets--Sheet 2.
O. B. THOMPSON.
Fifth-Wheel.
No. 164,611. Patented June 15, 1875.
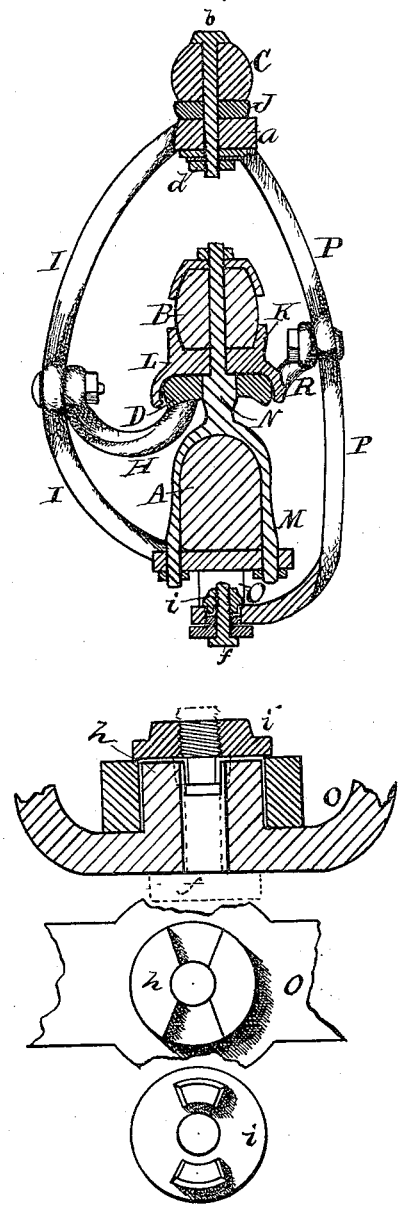
Witnesses;
Jas. F. Duhamel,
Thomas Byrne,
Inventor;
O. B. Thompson
Per H. S. Abbot
Attorney.

UNITED STATES PATENT OFFICE.

ORRIN B. THOMPSON, OF WHITE ASH, ASSIGNOR TO THE DEXTER SPRING COMPANY, OF HULTON, PENNSYLVANIA.

IMPROVEMENT IN FIFTH-WHEELS.

Specification forming part of Letters Patent No. 164,611, dated June 15, 1875; application filed April 3, 1875.

*To all whom it may concern:*

Be it known that I, ORRIN B. THOMPSON, of White Ash, county of Allegheny and State of Pennsylvania, have invented certain new and useful Improvements in Fifth-Wheels for Vehicles, of which the following is a specification:

The nature of my invention consists in the construction and arrangement of a fifth-wheel for vehicles, as will be hereinafter more fully set forth.

In order to enable other skilled in the art to which my invention appertains to make and use the same, I will now proceed to describe its construction and operation, referring to the annexed drawing, which forms a part of this specification, and in which—

Figure 1 is a rear view of my invention, and Fig. 2 is a front view; and Fig. 3 is a transverse vertical section of the same through the center pivots.

A represents the axle, and B the lower spring-bar. C is the upper spring-bar. On top of the center of the axle A is the lower circular friction-plate D, provided with straps E E, which fit over the top of the axle, and are fastened by means of clips G G. From the lower friction-plate D extend two curved arms, H H, toward the front, to the outer ends of which braces I I are secured. The lower ends of the braces form the bottom plates of the clips G G, while the upper ends of said braces are united and placed on a hub or stud, a, formed on the under side of a plate, J, which is fastened to the upper spring-bar C. A bolt, b, passes through this spring-bar and the hub a, and a suitable washer and nut, d, secured on the lower end of the bolt. On the under side of the lower spring-bar B is secured a plate, K, having the upper friction-plate L formed in its center, to fit over the lower friction-plate D. Under the lower friction-plate D, over the axle A, is fastened a clip, M, from the top of which extends the king-bolt N upward through the centers of the friction-plates D L, and through the lower spring-bar B, and held by a nut on top of the same. The bottom plate of the clip M forms a frame, O, in the center of which is an upward-projecting hub or stud, h. On this hub are placed the lower united ends of two braces, P P, which extend in rear of the axle, and their upper ends formed with the plate J on the under side of the upper spring-bar C. These braces are secured to curved arms R R, extending toward the rear from the upper friction-plate L. A suitable bolt, f, passes upward through the hub h, and has a nut, i, fastened on its upper end.

It will be seen that by this construction of the fifth-wheel the axle turns on three centers—namely, the hub h under the axle, the friction-plates D L between the axle and lower spring-bar, and the hub a under the upper spring-bar.

This kind of fifth-wheel is attached to a common vehicle, either with or without a reach, by fastening, in any appropriate manner, the upper hub or stud a above the head-block, or between the head-block and spring, or above the lower half of an elliptic spring. The rear braces P P may be attached to the reach, in vehicles using a reach.

The friction is reduced to a minimum, since it is close to the center of motion.

Having thus fully described my invention, what I claim as new, and desire to secure by Letters Patent, is—

1. A fifth-wheel for vehicles, constructed to form three centers or pivots, h, D L, and a, on which the axle turns, substantially as set forth.

2. The combination of friction-plates D and L, provided, respectively, with the arms H H and R R, substantially as and for the purposes set forth.

3. The combination of the lower friction-plate D with arms H H, braces I I, clips G G, and hub a, all constructed substantially as and purposes set forth.

4. The combination of the upper friction-plate L with arms R R, braces P P, plate J, and hub h, all constructed substantially as and for the purposes set forth.

In testimony that I claim the foregoing as my invention, I hereunto affix my signature this 17th day of March, 1875.

ORRIN BARNES THOMPSON.

Witnesses:
JOHN W. WILEY,
W. W. GRIER.